United States Patent [19]

Nicia et al.

[11] Patent Number: 4,741,588
[45] Date of Patent: May 3, 1988

[54] OPTICAL MULTIPLEXER AND DEMULTIPLEXER

[75] Inventors: Antonius J. A. Nicia; Theodorus L. Van Rooy; Jan Haisma, all of Eindhoven, Netherlands

[73] Assignee: U.S. Philips Corporation, New York, N.Y.

[21] Appl. No.: 411,927

[22] Filed: Aug. 26, 1982

[30] Foreign Application Priority Data

Sep. 7, 1981 [NL] Netherlands ............ 8104123

[51] Int. Cl.$^4$ ............ G02B 6/34; H04B 9/00
[52] U.S. Cl. ............ 350/96.19; 350/96.15; 350/96.16; 350/96.18; 350/402; 370/2; 370/3
[58] Field of Search ............ 350/96.15, 96.16, 96.18, 350/96.19, 96.20, 370, 372, 400, 402, 397; 370/1, 2, 3

[56] References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.19 |
| 4,239,329 | 12/1980 | Matsumoto | 350/96.18 |
| 4,335,933 | 6/1982 | Palmer | 350/96.19 |
| 4,373,814 | 2/1983 | Lacombat et al. | 350/96.15 |
| 4,385,799 | 2/1983 | Soref | 350/96.19 |
| 4,566,761 | 1/1986 | Carlsen et al. | 370/2 X |
| 4,571,024 | 2/1986 | Husbands | 350/96.19 |

FOREIGN PATENT DOCUMENTS

| | | | |
|---|---|---|---|
| 54-146646 | 11/1979 | Japan | 350/96.13 |
| 57-157003 | 12/1979 | Japan | 370/2 |

OTHER PUBLICATIONS

Tomlinson, "Wavelength Multiplexing . . . Fibers", Applied Optics, vol. 16, No. 8, 8/77, pp. 2180-2194.
Aoyama et al., "Low-Loss Optical . . . Region", Applied Optics, vol. 18, No. 16, 8/79, pp. 2834-2836.
Loewen et al., "Grating Efficiency . . . Gratings", Applied Optics, vol. 16, No. 10, 10/77, pp. 2711-2721.
Iogansen et al., "Space-Limited . . . Filter", Opt. Spektrosk, (USSR), 2/80, pp. 213-216.
Watanabe et al., "Optical Grating . . . Region", Elect. Lett., 1/80, vol. 16, No. 3, pp. 108-109.
Aoyama et al., "Optical Demultiplexer . . . System", Applied Optics, 4/79, vol. 18, No. 8, pp. 1253-1258.
Tomlinson et al., "Optical Wavelength . . . Region", Elect. Lett., 5/78, vol. 14, No. 11, pp. 345-347.
Iwamura et al., "Simple Polarization . . . Systems", Elect. Lett., 12/79, vol. 15, No. 25, pp 830-831.

Primary Examiner—William L. Sikes
Assistant Examiner—Brian M. Healy
Attorney, Agent, or Firm—Algy Tamoshunas

[57] ABSTRACT

In optical multiplexers and demultiplexers which utilize interference filters and optical gratings losses and noise are reduced by converting the unpolarized light into linearly polarized light. This improves the efficiency of the filters and gratings and suppresses noise which is caused by fluctuations in the degree of polarization of unpolarized light because filters and gratings have different characteristics for the different polarization directions.

7 Claims, 2 Drawing Sheets

OPTICAL MULTIPLEXER AND DEMULTIPLEXER

BACKGROUND OF THE INVENTION

The invention relates to an optical multiplexer and demultiplexer, comprising at least one first optical fibre for transporting several light signals of different wavelengths, a wavelength-selective member, further optical fibres for transporting at leeast one light signal in a given waveband, and a lines system which is arranged between the wavelength-selective member and the fibres, the arrangement being such that low-loss transmission paths which are dependent on the wavelength of the light extend between the frist optical fibre and the further optical fibres.

Optical multiplexers and demultiplexers of this kind are known from a publication in "Applied Optics", volume 16, No. 8, Aug. 1977, pages 2180-2194. It has been found that the multiplexers and demultiplexers disclosed in said publication introduce noise into signals transmitted in the form of light pulses. The resultant lower signal-to-noise ratio, of course, is undesirable, the more so if said devices are used in telecommunication networks in which the signal-to-noise ratio should remain as high as possible if signals are to be transmitted over long distances via the optical fibres with a minimum number of intermediate amplifiers.

SUMMARY OF THE INVENTION

It is an object of the invention to provide optical multiplexers and demultiplexers in which the signal-to-noise ratio is not affected and in which, more-over, the loss of signal intensity is reduced, so that the signal-to-noise ratio is improved.

To this end, the optical multiplexer and demultiplexer in accordance with the invention is characterized in that between the wavelength-selective member and the lens system an optical device for the low-loss conversion of unpolarzed light into substantially linearly polarized light is arranged. If has been found that fluctuations in the polarization state of unpolarized light cause noise, because the operation of wavelength-selective members (such as an optical grating or filter) is dependent on the degree of polarization of the light. Such fluctuations are eliminated by the linearization of the polarization of the light by the optical device.

It is to be noted that it is known (U.S. Pat. No. 4,153,330) to use double-refractive optical fibres in an optical multiplexer and demultiplexer, said fibres conducting only light having a given polarization direction. The device in accordance with the invention does not require such special fibres.

BRIEF DESCRIPTION OF THE DRAWINGS

Embodiments in accordance with the invention will be described in detail hereinafter with reference to the drawings, in which.

DETAILED DESCRIPTION OF THE INVENTION

Figure 1:
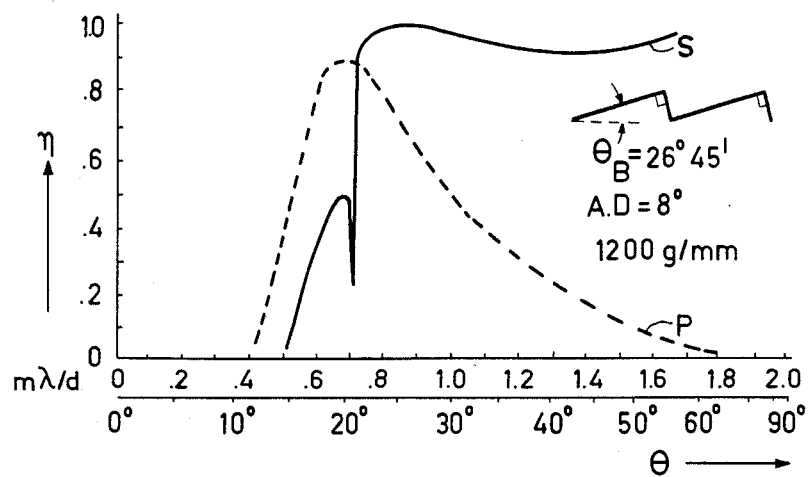
FIG. 1 shows a graph with efficiency curves of an optical grating used in optical multiplexers and demultiplexers.

FIG. 1 shows a graph with efficiency curves of a reflective grating of an optical multiplexer or demultiplexer. The graph comprises two curves, one curve being an uninterrupted line (denoted by S) and the other curve being a broken line (denoted by P). On the vertical axis there is plotted the efficiency $\eta$ which is determined by the ratio of the energy content of the diffracted light and the energy content of the light incident on the grating. Along the horizontal axis there is plotted the angle $\theta$ which is the angle at which the light is incident on the grating. The curve S in the graph relates to linearly polarized light, the electrical vector of which is directed transverse to the longitudinal direction of the grooves (S polarization). The curve (P) relates to linearly polarized light the electrical vector of which is directed parallel to the grooves of the grating (P polarization. It will be clear that for the majority of angles of incidence $\theta$ the efficiency of S polarization is higher than the efficiency of the grating for P polarization. This is described in detail in a publication in "Applied Optics", Oct. 1977, vol. 16, No. 10, pages 2711-2721.

Figure 2:
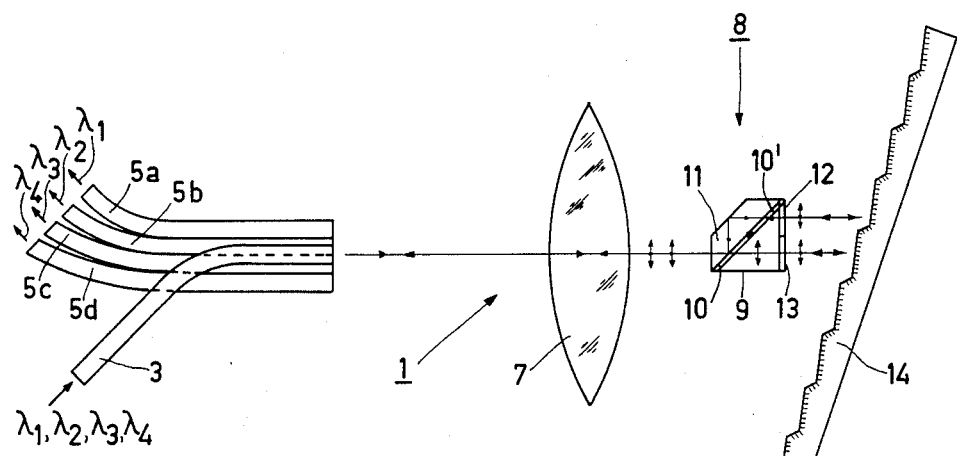
FIG. 2 shows an embodiment of an optical multiplexer and demultiplexer in accordance with the invention.

FIG. 2 shows an embodiment of an optical multiplexer and demlutiplexer 1 in accordance with the invention. The device 1 comprises the following known components in a known arrangement (for example, see Applied Optics, Vol. 18, No. 16, Aug. 1979, pages 2834-2836): an input fibre 3 which supplies light having the wavelengths $\lambda_1$, $\lambda_2$, $\lambda_3$ and $\lambda_4$ and, output fibres 5a, b, c and d to which light having the wavelength $\lambda_1$, $\lambda_2$, $\lambda_3$ and $\lambda_4$, respectively, is coupled. The arbitrarily polarized light which is supplied via the input fibre 3 is projected onto the grating 14 via a lines 7 and an optical device 8 which converts the light into two beams of linearly polarized light. The light reflected by the grating 14 is transmitted to the fibres 5a, b, c and d, via the device 8 and lens 7, in dependence on the wavelength.

The optical device 8 comprises two prisms 9 and 11 with a polarizing filter 10 therebetween. The filter 10 divides the incident light into two beams of linearly polarized light. Light having a polarization direction in the plane of the drawing (denoted by $\updownarrow$ ) is transmitted, while light having a polarization direction perpendicular thereto is reflected (denoted by •). The reflected light is reflected again in the prism 11, passes through a glass filler plate 10' and through a $\lambda/2$ plate 12 of crystalline quartz which rotates the polarization direction through an angle of 90°, and is subsequently incident on the grating 14. The light transmitted by the filter 10 passes through a glass filler plate 13 and is directed parallel to the light beam passing through the plate 12, Therefore, all of the input light is incident on the grating 14, as linearly polarized light, which is advantageous, as will be explained hereinafter.

Because the two light beams incident on the gratig 14 are linearly polarized on the same direction, fluctuations in the degree of polarization of the light entering via the fibre 3 do not affect the efficiency of the grating 14. Fluctuations in the degree of polarization of the light incident on a grating introduce noise in the light reflected by the grating, because under the influence of the fluctuations more or less light is reflected with the efficiency associated with the P polarization the S polarization.

The grating 14 is used with the highest efficiency when the electrical vector of the linear polarized light is directed at right angles to the grooves (S polarization). The use of the device not only prevents the introduction of undesirable noise, but also allows more effective use of the grating 14, thus reducing the loss of light.

Figure 3:
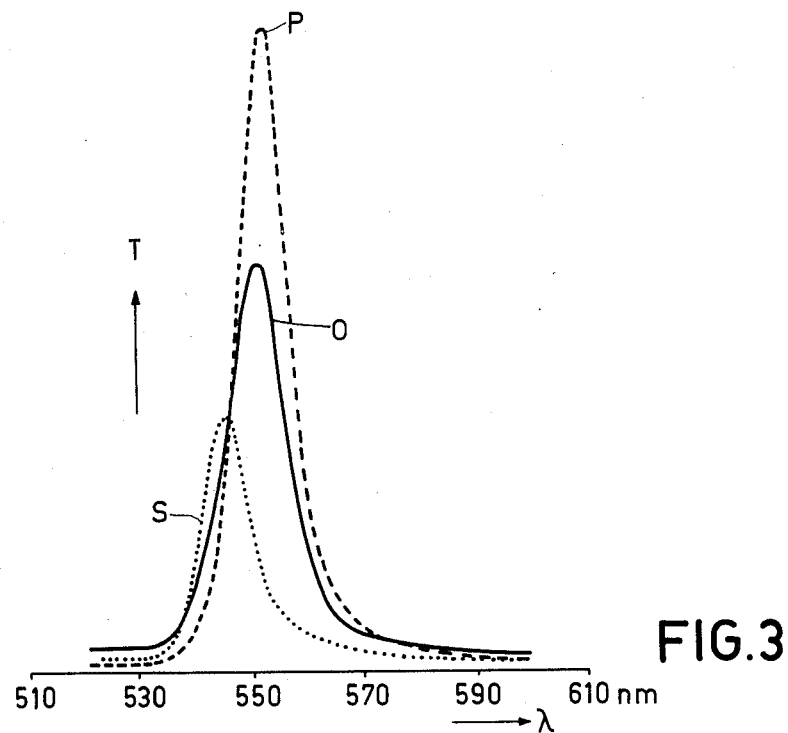
FIG. 3 shows a graph concerning the transmission efficiency of an interference filter.

FIG. 3 shows a graph with transmission efficiency curves of an interference filter which can be used in optical multiplexers and demultiplexers. Along the vertical axis there is plotted the transmission efficiency T and the wavelength of the light in nanometers, nm, is plotted along the horizontal axis. For light which is incident perpendicularly to the plane of the interference filter, the transmission curves are identical for light with S polarization of P polarization and hence also for unpolarized light. In optical multiplexers and demultiplexers, however, the light will usually be incident on the filter at an angle, so that light with S polarization encounters a different filter, as it were, than light with P polarization. The different transmission curves occurring in such circumstances for light with S polarization (dotted line) a and light with P polarization (broken line) are shown in the graph. For unpolarized light, the filter has a transmission characteristic O (uninterrupted line) which is determined by the arithmetical mean valve of the P curve and the S curve. It will be clear that when interference filters are used in multiplexers and demultplexers, the use of an optical device for converting unpolarized light into linearly polarized light reduces noise (in the case of fluctuations in the polarization degree of the unpolaried light) and at the same time improves the efficiency.

Figure 4:
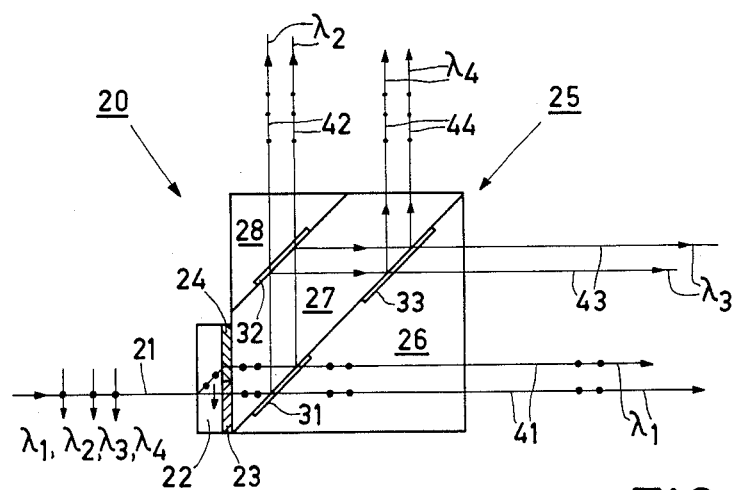
FIG. 4 shows a further embodiment of a multiplexer and demultiplexer in accordance with the invention.

FIG. 4 shows a further embodiment of a multiplexer and demultiplexer 20 in accordance with the invention, the optical fibres and lines systems having been omitted for the sake of simplicity. An incoming beam 21 of unpolarized light of different wavelengths $\lambda_1$, $\lambda_2$, $\lambda_3$ and $\lambda_4$ is converted, by means to be described, into two beams of linearly polarized light whose polarization direction is perpendicular to the plane of the drawing. A colour shifter 25, which is composed of three prisms 26, 27 and 28 wherebetween interference filters 31, 32 and 33 are arranged, splits the two beams of linearly polarized light, depending on wavelength, into four beams 41, 42, 43 and 44 of linearly polarized light having wavelengths $\lambda_1$, $\lambda_2$, $\lambda_3$ and $\lambda_4$, respectively.

The optical device 20 comprises a plate 22 of uniaxial anisotropic material, for example, calcite, sapphire or rutile which splits the unpolarized light into two beams of linearly polarized light whose polarization directions are perpendicular to one another. The beam of light which is not deflected has a polarization direction in the plane of the drawing and passes through a $\lambda/2$ plate 23 of crystalline quartz, so that the polarization direction becomes perpendicular to the plane of the drawing. Due to the extraordinary refraction in the plate 22, the light having a polarization direction perpendicular to the plane of the drawing is deflected to the colour shifter 25 via a glass filler plate 24. The beams emerging via the $\lambda/2$ plate 23 and via the glass plate 24 are parallel to one another.

In order to obtain correct refraction, the propagation direction of the light must be perpendicular to the plate 22 and the optical axis of the material of the plate 22 must enclose an angle with respect to the surface thereof. This angle is determined by the arc tangent of the quotient of the extraordinary and the ordinary refractive indices.

What is claimed is:

1. An optical multiplexer and demultiplexer comprising a first optical fiber for transmitting a pluarlity of light signals of different wavelengths, a plurality of further optical fibers each transmitting a different light signal of at least one of said different wavelengths, wavelength-selective means for directing light of said different wavelengths along a plurality of wavelength-dependent paths between said one fiber and said further fibers, each of said further fibers being associated with a respective one of said paths, means for optically coupling said first and further fibers to said wavelength-selective means, and means arranged between said coupling means and said wavelength-seletive means for converting unpolarized light into substantially linearly polarized light so that light incident on said wavelength selective means is linearly polarized, said converting means comprising means for producing from said unpolarized light two beams of linearly polarized light whose polarization directions are perpendicular to one another and an optical member for rotating the polarization direction of one of the beams through an angle of 90°.

2. An optical multiplexer and demultiplexer as claimed in claim 1, wherein said producing means comprises a flat plate of uniaxial, anisotropic material, the propagation direction being directed perpendicularly thereto whilst the optical axis of said plate encloses an angle with respect to the propagation direction which is determined by the arc tangent of the quotient of the extraordinary and the ordinary refractive indices in order to divide the light into two beams of linearly polarized light whose polarization directions are perpendicular to one another.

3. An optical multiplexer and demultiplexer as claimed in claim 2, wherein said optical member is a flat $\lambda/2$ plate of crystalline quartz.

4. An optical multiplexer and demuliplexer as claimed in claim 1, or 2 wherein said wavelength-selective means includes an optical grating, the electrical vector of the linearly polarized light being directed at right angles to the grooves of the optical grating.

5. An optical multiplexer and demultiplexer as claimed in claim 1 or 2 wherein said wavelength-selective means includes an interference filter.

6. An optical multiplexer and demultiplexer as claimed in claim 1 wherein said coupling means includes a lens for projecting light from said fibers onto said wavelength selective means.

7. An optical multiplexer and demultiplexer as claimed in claim 2 wherein said anisotropic material is calcite.

* * * * *